(12) United States Patent
Kim et al.

(10) Patent No.: US 10,626,208 B2
(45) Date of Patent: *Apr. 21, 2020

(54) VINYL CHLORIDE-BASED COPOLYMER, METHOD FOR PREPARING THE SAME, AND THERMOPLASTIC RESIN COMPOSITION CONTAINING THE SAME

(71) Applicant: LG CHEM, LTD., Seoul (KR)

(72) Inventors: Kun Ji Kim, Daejeon (KR); Seong Yong Ahn, Daejeon (KR); Se Woong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 170 days.

This patent is subject to a terminal disclaimer.

(21) Appl. No.: 15/542,980

(22) PCT Filed: Nov. 11, 2016

(86) PCT No.: PCT/KR2016/013008
§ 371 (c)(1),
(2) Date: Jul. 12, 2017

(87) PCT Pub. No.: WO2017/099373
PCT Pub. Date: Jun. 15, 2017

(65) Prior Publication Data
US 2018/0009921 A1 Jan. 11, 2018

(30) Foreign Application Priority Data
Dec. 7, 2015 (KR) .................. 10-2015-0173427

(51) Int. Cl.
| C08F 271/02 | (2006.01) |
| C08L 27/06 | (2006.01) |
| C08F 214/06 | (2006.01) |
| C08F 226/06 | (2006.01) |
| C08F 226/10 | (2006.01) |
| C08F 222/10 | (2006.01) |
| C08F 222/14 | (2006.01) |

(52) U.S. Cl.
CPC .......... *C08F 271/02* (2013.01); *C08F 214/06* (2013.01); *C08F 222/10* (2013.01); *C08F 222/14* (2013.01); *C08F 226/06* (2013.01); *C08F 226/10* (2013.01); *C08L 27/06* (2013.01)

(58) Field of Classification Search
CPC .... C08F 114/06; C08F 214/06; C08F 126/06; C08F 126/10; C08F 226/06; C08F 226/10; C08F 122/10; C08F 122/14; C08F 222/10; C08F 222/14; C08F 271/02; C08F 26/06; C08F 26/10
See application file for complete search history.

(56) References Cited

U.S. PATENT DOCUMENTS

| 2,849,423 | A | * | 8/1958 | Rowland, Jr. | ......... C08F 214/06 526/206 |
| 3,053,801 | A | | 9/1962 | Bingham et al. | |
| 3,544,539 | A | | 12/1970 | Koyanagi et al. | |
| 3,817,959 | A | * | 6/1974 | Balwe | ..................... C08F 14/06 526/200 |
| 4,210,739 | A | | 7/1980 | Gallagher et al. | |
| 4,480,076 | A | * | 10/1984 | Melby | ................... C08F 259/04 525/205 |
| 5,204,421 | A | | 4/1993 | Amano et al. | |
| 5,506,318 | A | | 4/1996 | Wetzel et al. | |
| 7,001,960 | B2 | | 2/2006 | Ooura et al. | |
| 10,138,311 | B2 | * | 11/2018 | Ahn | ........................ C08F 14/06 |
| 2015/0011657 | A1 | * | 1/2015 | Destarac | ................. C08F 26/06 514/772.5 |
| 2017/0283533 | A1 | * | 10/2017 | Ahn | ........................ C08F 222/14 |
| 2017/0291974 | A1 | * | 10/2017 | Ahn | ........................ C08F 14/06 |

FOREIGN PATENT DOCUMENTS

| BE | 615269 A | 7/1962 |
| EP | 0 530 80 A2 | 6/1982 |
| EP | 0225447 A1 | 6/1987 |
| GB | 1278233 A | 6/1972 |
| JP | 2015-000880 A | 1/2015 |
| KR | 10-2008-0053686 A | 6/2008 |
| KR | 10-2011-0008882 A | 1/2011 |
| KR | 10-2012-0054162 A | 5/2012 |
| KR | 10-2013-0001428 A | 1/2013 |

OTHER PUBLICATIONS

Scifinder Properties of CAS 9003-39-8 (Year: 2019).*

* cited by examiner

*Primary Examiner* — Kregg T Brooks
(74) *Attorney, Agent, or Firm* — Dentons US LLP

(57) ABSTRACT

The present invention relates to a vinyl chloride-based copolymer which has good processability and thus is capable of providing molded articles having good appearance characteristics, for example, transparency, a method for preparing the same, a thermoplastic resin composition containing the same, and a thermoplastic resin molded article produced from the thermoplastic resin composition. The vinyl chloride-based copolymer includes N-vinyllactam-based polymer compound derived units and unsaturated fatty acid ester derived units at an appropriate ratio, and may have improved structure stability and good processability due to the N-vinyllactam-based polymer compound derived units and improved plasticity and processability due to the internal plasticizer action of the unsaturated fatty acid ester derived units. Therefore, the vinyl chloride-based copolymer according to the present invention may be easily applied in industries that need thereof.

14 Claims, No Drawings

VINYL CHLORIDE-BASED COPOLYMER, METHOD FOR PREPARING THE SAME, AND THERMOPLASTIC RESIN COMPOSITION CONTAINING THE SAME

CROSS-REFERENCE TO RELATED APPLICATIONS

This application is a National Stage Entry of International Application No. PCT/KR2016/013008, filed on Nov. 11, 2016, and claims the benefit of and priority to Korean Application No. 10-2015-0173427, filed on Dec. 7, 2015, all of which are hereby incorporated by reference in their entirety for all purposes as if fully set forth herein.

TECHNICAL FIELD

The present invention relates to a vinyl chloride-based copolymer which has good processability and thus is capable of providing molded articles with good appearance characteristics such as transparency, a method for preparing the same, a thermoplastic resin composition containing the same, and a thermoplastic resin molded article produced from the thermoplastic resin composition.

BACKGROUND ART

A vinyl chloride-based polymer is a homopolymer of vinyl chloride or a copolymer including 50% or more of vinyl chloride, wherein it has been widely used in areas, such as piping materials and building materials, due to excellent mechanical strength, weather resistance, and chemical resistance. However, since the vinyl chloride-based polymer by itself has low moldability, various additives such as a plasticizer, are appropriately added to provide processability.

In general, the moldability of the vinyl chloride-based polymer largely depends on particle characteristics of the vinyl chloride-based polymer. Also, in order to improve productivity during the preparation of a molded article using the vinyl chloride-based polymer, there is a need to improve gelling properties, plasticizer absorbency, or powder flowability by controlling bulk density or internal porosity, a particle diameter, or particle distribution of vinyl chloride-based polymer particles.

As a typical method of improving the moldability of the vinyl chloride-based polymer, a method of improving processability of a vinyl chloride polymer itself by using a dispersion stabilizer such as polyvinyl alcohol, during polymerization of the vinyl chloride-based polymer has been proposed. However, according to the above method, bulk specific gravity of the vinyl chloride-based polymer may be increased, but melting characteristics of the polymer may be deteriorated.

Accordingly, as a method of improving the melting characteristics as well as the processability of the vinyl chloride-based polymer, a method of controlling distribution of polymerization degree by changing temperature during the polymerization of the vinyl chloride-based polymer has been proposed. However, according to the above-described methods, a vinyl chloride-based polymer having high bulk density as well as improved processability may be prepared, but productivity may be reduced due to an increase in polymerization reaction time, and deterioration of physical properties of the polymer itself, for example, an increase in colorability or a decrease in mechanical properties, may occur due to a side reaction between an additive and a reactant such as a vinyl chloride-based monomer, according to the changes in the polymerization temperature.

As another method of improving the moldability of the vinyl chloride-based polymer, a method of using a plasticizer with the vinyl chloride-based polymer during the preparation of a molded article has mainly been used. However, when the plasticizer is used as described above, since the plasticizer may move to a surface of the product, stickiness of the surface may occur and plasticity may be gradually reduced over time. In particular, with respect to a phthalate-based plasticizer mainly used, a lot of smoke may be generated during combustion, flexibility may occur at high temperature, and high energy may be required during processing Also, the appearance characteristics of molded articles are considered very meaningful together with the improvement of molding technique or mixing technique, and there is a need to develop a technique which may decrease the generation of fish-eyes and improve transparency.

For example, U.S. Pat. No. 5,204,421 discloses a preparation method in which a dispersant having a degree of hydration of 20% to 55% is added in installments in the initial stage and the middle stage of polymerization, and indicates that a vinyl chloride polymer having excellent plasticizer absorption and a small number of fish-eyes can be prepared through the preparation method. U.S. Pat. No. 7,001,960 discloses a preparation method in which a dispersant having a degree of hydration of 20% to 57% is continuously added from the initial stage of polymerization to the middle stage of polymerization, and indicates that a vinyl chloride polymer having a small number of fish-eyes can be prepared through the preparation method. Korean patent publication No. 2013-0001428 discloses a method for suppressing the formation of scale in a polymerization reactor and thus preventing the generation of fish-eyes by adding a metal deactivator during a polymerization reaction. However, the above conventional methods have a negligible effect on the reduction of fish-eyes and cannot significantly improve the transparency of produced molded articles.

Therefore, in order to easily apply a vinyl chloride-based polymer to various fields, it is necessary to develop a technique capable of improving the processability of the vinyl chloride-based polymer and the appearance characteristics of produced molded articles.

DISCLOSURE OF THE INVENTION

Technical Problem

The present invention has been devised in consideration of the above-mentioned problems, and the object of the present invention is to provide a vinyl chloride-based copolymer which has improved processability and may exhibit good appearance characteristics.

Another object of the present invention is to provide a method for preparing the vinyl chloride-based copolymer.

Still another object of the present invention is to provide a thermoplastic resin composition containing the vinyl chloride-based copolymer.

In addition, still another object of the present invention is to provide a thermoplastic resin molded article produced from the thermoplastic resin composition.

Technical Solution

To solve the above-described tasks, the present invention provides a vinyl chloride-based copolymer containing unsaturated fatty acid ester derived units and N-vinyllactam-based polymer compound derived units.

In addition, the present invention provides a method for preparing the vinyl chloride-based copolymer including adding an N-vinyllactam-based polymer compound and an unsaturated fatty acid ester to a vinyl chloride-based monomer in the presence of a polymerization initiator and a protective colloid auxiliary, and performing suspension polymerization.

In addition, the present invention provides a thermoplastic resin composition containing the vinyl chloride-based copolymer.

Furthermore, the present invention provides a thermoplastic resin molded article produced from the thermoplastic resin composition.

Advantageous Effects

A vinyl chloride-based copolymer according to the present invention contains N-vinyllactam-based polymer compound derived units and unsaturated fatty acid ester derived units at an appropriate ratio, and the structure stability and the processability thereof may be improved due to the N-vinyllactam-based polymer compound derived units, and the plasticity and the processability thereof may be further improved due to the action of an internal plasticizer of the unsaturated fatty acid ester derived units.

By using a method for preparing the vinyl chloride-based copolymer according to the present invention, a vinyl chloride-based copolymer may be easily prepared at a high polymerization conversion rate without increasing polymerization time.

In addition, since a thermoplastic resin composition according to the present invention includes a vinyl chloride-based copolymer containing unsaturated fatty acid ester derived units and N-vinyllactam-based polymer compound derived units, the processability thereof may be good.

Furthermore, since a thermoplastic resin molded article according to the present invention is produced from the thermoplastic resin composition, the appearance characteristics thereof, for example, the transparency thereof may be excellent.

Therefore, the vinyl chloride-based copolymer according to the present invention, the method for preparing the same, the thermoplastic resin composition containing the same, and the thermoplastic resin molded article manufactured using the composition may be readily applied to industries as needed.

BEST MODE FOR CARRYING OUT THE INVENTION

Hereinafter, the present invention will now be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The present invention provides a vinyl chloride-based copolymer which has excellent processability and thus is capable of providing molded articles having excellent transparency.

The vinyl chloride-based copolymer according to an embodiment of the present invention is characterized in including vinyl chloride-based monomer derived units, unsaturated fatty acid ester derived units, and N-vinyllactam-based polymer compound derived units.

The vinyl chloride-based copolymer may include the N-vinyllactam-based polymer compound derived units in an amount of 0.04 parts by weight to 0.5 parts by weight on the basis of 100 parts by weight of a copolymer. If the N-vinyllactam-based polymer compound derived units are included in an amount less than 0.04 parts by weight, the improving effect of transparency, color and processability may be insignificant, and if the N-vinyllactam-based polymer compound derived units are included in an amount greater than 0.5 parts by weight, transparency may be deteriorated, and defects of deteriorating processability may be generated. In addition, at least a portion of the N-vinyllactam-based polymer compound derived units may be combined with chlorine atoms in the vinyl chloride-based monomer derived units. In addition, at least a portion of the remaining N-vinyllactam-based polymer compound may be present as a dispersed phase in the vinyl chloride-based copolymer.

The terms "derived unit" used in the present disclosure may mean a structure or a material formed by a certain material, or the material itself. For example, an N-vinyllactam-based polymer compound derived unit may mean a structure or a newly formed material from the N-vinyllactam-based polymer compound, or the N-vinyllactam-based polymer compound itself.

The terms "at least a portion" used in the present disclosure may mean a portion or more, i.e., from a portion to the entire amount, for example, from 1 part to 10 parts when the entire amount is divided into ten parts.

The terms "dispersed phase" used in the present disclosure may mean a particle constituting phase, when a material constituting a colloidal dispersion system is divided into two phases including a particle constituting phase and a phase of a medium (continuous phase).

The N-vinyllactam-based polymer compound may be a homopolymer or a copolymer having an N-vinyllactam-based structure.

In particular, the homopolymer may be at least one selected from the group consisting of poly(N-vinylpyrrolidone), poly(N-vinyl-4-butylpyrrolidone), poly(N-vinyl-4-propylpyrrolidone), poly(N-vinyl-4-ethylpyrrolidone), poly(N-vinyl-4-methyl-5-ethylpyrrolidone), poly(N-vinylcaprolactam), poly(N-vinyl-6-methylcaprolactam), and poly(N-vinyl-7-butylcaprolactam).

The copolymer may be at least one selected from the group consisting of an N-vinyl piperidone-vinyl alcohol copolymer, an N-vinyl-4-butylpyrrolidone-vinyl alcohol copolymer, and an N-vinyl-4-propylpyrrolidone-vinyl alcohol copolymer.

In the vinyl chloride-based copolymer according to an embodiment of the present invention, carbonyl groups in the N-vinyllactam-based polymer compound derived units may be combined with chlorine atoms in the vinyl chloride-based monomer derived units, and the generation of an unstable structure in a copolymer chain may be suppressed, and the plasticity thereof may be improved due to a cyclic imide structure in the N-vinyllactam-based polymer compound derived units.

In addition, the vinyl chloride-based copolymer may include vinyl chloride-based monomer derived units and unsaturated fatty acid ester derived units.

In particular, the vinyl chloride-based copolymer may include from 65 wt % to 97 wt % of the vinyl chloride-based monomer derived units and from 3 wt % to 35 wt % of the unsaturated fatty acid ester derived units.

The vinyl chloride-based monomer derived unit may be prepared from a vinyl chloride-based monomer via the following preparation method.

The vinyl chloride-based monomer may be a vinyl chloride monomer alone, or a combination of a vinyl chloride monomer and a vinyl-based monomer which is copolymerizable therewith. When the vinyl chloride-based monomer is the combination of a vinyl chloride monomer and a vinyl-based monomer, the amount of vinyl chloride in a finally prepared vinyl chloride-based copolymer may be controlled so as to be 50 wt % or more.

Examples of the vinyl-based monomer which is copolymerizable with the vinyl chloride monomer may include, but not limited to, for example, olefin compounds such as ethylene, propylene and butane; vinyl esters such as vinyl acetate, vinyl propionate and vinyl stearate; unsaturated nitriles such as acrylonitrile; vinyl alkyl ethers such as vinyl methyl ether, vinyl ethyl ether, vinyl octyl ether and vinyl lauryl ether; vinylidene halides such as vinylidene chloride; unsaturated fatty acids and anhydrides of these fatty acids such as acrylic acid, methacrylic acid, itaconic acid, maleic acid, fumaric acid, maleic anhydride and itaconic anhydride; unsaturated fatty acid esters such as methyl acrylate, ethyl acrylate, monomethyl maleate, dimethyl maleate and butyl benzyl maleate; and crosslinkable monomers such as diallyl phthalate, and the above-mentioned vinyl-based monomers may be used alone or as a mixture of two or more thereof.

In addition, the unsaturated fatty acid ester derived units may be formed from an unsaturated fatty acid ester via the following preparation method, and may be copolymerized with the vinyl chloride-based monomer so as to act as an internal plasticizer and thus serve to improve the processability of the vinyl chloride-based copolymer.

The unsaturated fatty acid ester derived units may include the cis-isomer derived units of the unsaturated fatty acid ester and the trans-isomer derived units of the unsaturated fatty acid ester. In this case, the cis-isomer derived units and the trans-isomer derived units of the unsaturated fatty acid ester may have a weight ratio of 60:40 to 99:1.

As described above, the unsaturated fatty acid ester derived units may include the cis-isomer derived units and the trans-isomer derived units of the unsaturated fatty acid ester. The cis-isomer of the unsaturated fatty acid ester exhibits excellent reactivity, and the trans-isomer of the unsaturated fatty acid ester exhibits relatively lower reactivity than the cis-isomer and has properties favorable for copolymerization than homopolymerization due to steric hindrance. Thus, in order to increase plasticity of a vinyl chloride-based copolymer including thereof, it may be important to adjust the ratio of the cis-isomer to the trans-isomer of the unsaturated fatty acid ester.

The vinyl chloride-based copolymer according to an embodiment of the present invention may have excellent plasticity by including the cis-isomer derived units and the trans-isomer of the unsaturated fatty acid ester in the unsaturated fatty acid ester derived units within the above-described ratio range, and the plasticizer migration of a thermoplastic resin molded article manufactured from a thermoplastic resin composition including the vinyl chloride-based copolymer may be decreased, and the processability thereof may be improved.

The unsaturated fatty acid ester may be an unsaturated dicarboxylic acid ester. In particular, the cis-isomer of the unsaturated fatty acid ester may be a compound represented by Formula 1 below, and the trans-isomer of the unsaturated fatty acid ester may be a compound represented by Formula 2 below.

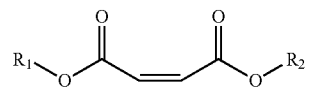

[Formula 1]

In Formula 1, $R_1$ and $R_2$ may be each independently selected from the group consisting of a linear or branched alkyl group having 5 to 13 carbon atoms, a cycloalkyl group having 5 to 12 carbon atoms, and a combination thereof. In particular, $R_1$ and $R_2$ may be each independently a linear or branched alkyl group having 6 to 10 carbon atoms.

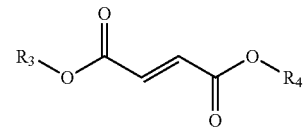

[Formula 2]

In Formula 2, $R_3$ and $R_4$ may be each independently selected from the group consisting of a linear or branched alkyl group having 5 to 13 carbon atoms, a cycloalkyl group having 5 to 12 carbon atoms, and a combination thereof. In particular, $R_3$ and $R_4$ may be each independently a linear or branched alkyl group having 6 to 10 carbon atoms.

In the present disclosure, unless otherwise specified, "the combination thereof" may mean that at least two functional groups are combined by a single bond, a double bond (ethylene group), a triple bond (acetylene group) or through a linker such as an alkylene group having 1 to 20 carbon atoms (for example, a methylene group ($—CH_2—$) or an ethylene group ($—CH_2CH_2—$), etc.), or two or more functional groups are linked by condensation.

Particularly, the cis-isomer and the trans-isomer of the unsaturated fatty acid ester may be dihexyl maleate and fumarate; didecyl maleate and fumarate; diundecyl maleate and fumarate; didodecyl maleate and fumarate; or hexyloctyl maleate and fumarate.

In addition, as described above, the vinyl chloride-based copolymer according to an embodiment of the present invention may include from 65 wt % to 97 wt % of the vinyl chloride-based monomer derived units; and from 3 wt % to 35 wt % of the unsaturated fatty acid ester derived units, and particularly, may include from 65 wt % to 80 wt % of the vinyl chloride-based monomer derived units; and from 20 wt % to 35 wt % of the unsaturated fatty acid ester derived units.

If the amount of the vinyl chloride-based monomer derived units in the vinyl chloride-based copolymer is greater than 97 wt % and the amount of the unsaturated fatty acid ester derived units is less than 3 wt %, antiplasticization phenomenon may occur, and the mechanical properties of the vinyl chloride-based copolymer may be deteriorated, thereby deteriorating the mechanical properties of a thermoplastic resin molded article produced from a thermoplastic resin composition including the vinyl chloride-based copolymer. On the contrary, if the amount of the vinyl chloride-based monomer derived units in the vinyl chloride-based copolymer is less than 65 wt % and the amount of the unsaturated fatty acid ester derived units is greater than 35 wt %, plasticity may be rather deteriorated and mechanical properties may be deteriorated due to the excessive amount of the unsaturated fatty acid ester derived units.

In addition, a method for preparing the vinyl chloride-based copolymer is provided in the present invention.

A method for preparing a vinyl chloride-based copolymer according to an embodiment of the present invention is characterized in including adding an N-vinyllactam-based polymer compound and an unsaturated fatty acid ester to a vinyl chloride-based monomer in the presence of a polymerization initiator and a protective colloid auxiliary, and performing suspension polymerization (step A).

Step A is a step for preparing a vinyl chloride-based copolymer and may be performed by adding an N-vinyllactam-based polymer compound and an unsaturated fatty acid ester to a vinyl chloride-based monomer, and suspension polymerizing.

In particular, step A may be performed by adding an N-vinyllactam-based polymer compound and an unsaturated fatty acid ester to a polymerization reactor provided with a vinyl chloride-based monomer, and then performing suspension polymerization. In this case, the polymerization reactor may be a filled-reactor with a solvent, a polymerization initiator and a protective colloid auxiliary prior to be provided with the vinyl chloride-based monomer.

The "filled-reactor" herein may mean a reactor in a state in which a solvent, a polymerization initiator and a protective colloid auxiliary are added prior to be provided with the vinyl chloride-based monomer.

The vinyl chloride-based monomer may be a pure vinyl chloride monomer alone, or a combination of a vinyl chloride monomer and a vinyl-based monomer which is copolymerizable therewith in accordance with the purpose. In the case where the vinyl chloride-based monomer is the combination of the vinyl chloride monomer and the vinyl-based monomer, the combination ratio may be controlled so that the content of vinyl chloride in a finally prepared vinyl chloride-based copolymer may be 50 wt % or more. Specific examples of the vinyl-based monomer may be the same as described above.

The unsaturated fatty acid ester may be added as a comonomer which is capable of forming a copolymer with a vinyl chloride-based monomer, so as to be included in a finally prepared vinyl chloride-based copolymer at a specific ratio to serve the improvement of the plasticity of the copolymer.

The unsaturated fatty acid ester may include the cis-isomer of the unsaturated fatty acid ester and the trans-isomer of the unsaturated fatty acid ester. The weight ratio between the cis-isomer and the trans-isomer of the unsaturated fatty acid ester may be 60:40 to 99:1. Specific examples of the cis-isomer and the trans-isomer of the unsaturated fatty acid ester may be the same as described above.

In addition, the amount of the unsaturated fatty acid ester may be from 3 parts by weight to 53 parts by weight on the basis of 100 parts by weight of the vinyl chloride-based monomer.

The unsaturated fatty acid ester may be batch-added or continuously added to a polymerization reactor provided with a vinyl chloride-based monomer at a time when the polymerization conversion rate is in a range of 35% or less.

In the present invention, the terms "polymerization conversion rate" may mean conversion rate of a vinyl chloride-based monomer to a polymer and may be measured by using a butane tracer equipped with gas chromatography. Particularly, a polymerization conversion curve according to the ratio of the vinyl chloride-based monomer to butane with time is drawn under predetermined polymerization conditions for each polymerization condition, and the polymerization conversion rate according to each polymerization condition may be measured on the basis of the curve. Also, the polymerization conversion rate may include a tolerance of the measurement, and, for example, may include up to ±3% from 35%.

The terms "batch addition" used in the present invention may mean addition of the entire amount of a material used at a certain time.

The terms "continuous addition" used in the present invention may mean addition of the entire amount of a material used continuously at a constant rate during a certain time period.

Particularly, the continuous addition may be addition of an unsaturated fatty acid ester continuously to a polymerization reactor provided with a vinyl chloride-based monomer at the time when the polymerization conversion rate is in a range of 35% or less, and in particular, may be performed in such a manner that the addition of the unsaturated fatty acid ester is started when the polymerization conversion rate is 20% or more, and the addition is ended when the polymerization conversion rate is 35% or less. The addition may be performed in such a manner that an entire amount of the unsaturated fatty acid ester is added at a constant rate from the start to the end of the addition.

The N-vinyllactam-based polymer compound may be used in an amount of 0.005 parts by weight to 1 part by weight on the basis of 100 parts by weight of the vinyl chloride-based monomer.

Meanwhile, the N-vinyllactam-based polymer compound may be added at a certain time during suspension polymerization.

In particular, the N-vinyllactam-based polymer compound may be added at least one point among the initial stage, middle stage, or end stage of the suspension polymerization for the participation thereof in a polymerization reaction.

The initial stage of the suspension polymerization may be, for example, when the polymerization conversion rate is from 0% to less than 30%, the middle stage of the suspension polymerization may be when the polymerization conversion rate is from 30% to less than 60%, and the end stage of the suspension polymerization may be when the polymerization conversion rate is from 60% to 85%. That is, the N-vinyllactam-based compound may be added at least one point in a range before the initiation of the suspension polymerization to immediately after the completion of the suspension polymerization.

In addition, the N-vinyllactam-based polymer compound may be batch-added, added in installments, or continuously added at least one point among the above-described points.

In particular, the entire amount of the N-vinyllactam-based polymer compound used in the suspension polymerization may be batch-added at a point, separately added in installments in two or more points, or continuously added during a certain time period.

The terms "addition in installments" used in the present invention may mean addition of the entire amount of a material in installments at many points.

In addition, the protective colloid auxiliary functions to stabilize reactants during polymerization and allows the production of uniform and stable particles, wherein the protective colloid auxiliary may be used in an amount of 0.03 parts by weight to 5 parts by weight on the basis of 100 parts by weight of the vinyl chloride-based monomer that is used in the polymerization.

Particularly, the protective colloid auxiliary may be used in an amount of 0.05 parts by weight to 2.5 parts by weight on the basis of 100 parts by weight of the vinyl chloride-based monomer. If the protective colloid auxiliary is used in an amount of less than 0.03 parts by weight, the particle size of a vinyl chloride-based copolymer finally prepared increases excessively, and fish-eyes may be generated in a molded article manufactured using a thermoplastic resin composition including the vinyl chloride-based copolymer. In the case where the protective colloid auxiliary is used in an amount of greater than 5 parts by weight, initial colorability of a molded article manufactured using a thermoplastic resin composition including the vinyl chloride-based copolymer may be deteriorated due to the increase of fine particles in the vinyl chloride-based copolymer finally prepared.

The protective colloid auxiliary may be one selected from the group consisting of a vinyl alcohol-based resin, cellulose, and an unsaturated organic acid polymer, or a mixture of two thereof, and particularly, the protective colloid auxiliary may be a mixture in which the vinyl alcohol-based resin and the cellulose are mixed in a weight ratio of 5:1 to 7:7. In this case, the vinyl alcohol-based resin may be a mixture in which a first polyvinyl alcohol having a degree of hydration between greater than 50 wt % and 90 wt % or less, and a second polyvinyl alcohol having a degree of hydration between 30 wt % and 50 wt % are mixed in a weight ratio of 2:1 to 1:2.

Furthermore, the cellulose may include methyl cellulose, hydroxyethyl cellulose, or hydroxypropylmethyl cellulose, and any one thereof or a mixture of two or more thereof may be used. Among them, the cellulose may be hydroxypropylmethyl cellulose and more particularly, an amount of a hydroxypropyl group in a molecule may be in a range of 3 wt % to 20 wt %, and viscosity of a 2% aqueous solution at 23±5° C. may be in a range of 10 cps to 20,000 cps.

Also, the unsaturated organic acid polymer may include an acrylic acid polymer, a methacrylic acid polymer, an itaconic acid polymer, a fumaric acid polymer, a maleic acid polymer, or a succinic acid polymer, and any one thereof or a mixture of two or more thereof may be used.

The polymerization initiator may be used in an amount of 0.02 parts by weight to 0.2 parts by weight on the basis of 100 parts by weight of the vinyl chloride-based monomer that is used in the polymerization. Particularly, the polymerization initiator may be used in an amount of 0.04 parts by weight to 0.12 parts by weight on the basis of 100 parts by weight of the vinyl chloride-based monomer. If the amount of the polymerization initiator is less than 0.02 parts by weight, polymerization reaction time may be increased, and the conversion rate to the vinyl chloride-based copolymer may be decreased, thereby decreasing the productivity. If the amount of the polymerization initiator is greater than 0.2 parts by weight, the polymerization initiator may not be completely consumed during the polymerization but may remain in the vinyl chloride-based copolymer finally prepared, thereby causing worry on the decrease of physical properties, particularly deteriorating the thermal stability of the polymer.

The polymerization initiator is not specifically limited but may include, for example, peroxide-based compounds such as dicumyl peroxide, dipentyl peroxide, di-3,5,5-trimethyl hexanoyl peroxide, and dilauryl peroxide; peroxydicarbonate-based compounds such as diisopropyl peroxydicarbonate, di-sec-butyl peroxydicarbonate, and di-2-ethylhexyl peroxydicarbonate; peroxyester-based compounds such as t-butyl peroxypivalate, 1,1,3,3-tetramethylbutyl peroxyneodecanoate, and t-butyl peroxyneodecanoate; azo-based compounds such as azobis-2,4-dimethylvaleronitrile; hydroperoxide-based compounds such as t-butyl hydroperoxide; or sulfate-based compounds such as potassium persulfate and ammonium persulfate, and any one thereof or a mixture of two or more thereof may be used.

The suspension polymerization is not specifically limited but, for example, may be performed in a temperature range of 30° C. to 70° C., and the temperature during the suspension polymerization may be appropriately controlled within the above temperature range according to the desired degree of polymerization. For example, the higher the desired degree of polymerization is, the lower the temperature may be, and the lower the desired degree of polymerization is, the higher the temperature may be.

In the suspension polymerization, polymerization may be ended by adding a reaction terminator, and the end point may be a point at which a pressure in the reactor is in a range of 6 $kg/cm^2$ to 8 $kg/cm^2$ (or a point at which the polymerization conversion rate is greater than 85%).

The reaction terminator is not specifically limited, but may include, for example, phenolic compounds, amine compounds, nitrile compounds, or sulfur compounds. Particularly, the reaction terminator may be at least one selected from the group consisting of phenolic compounds such as triethylene glycol-bis-3-(3-t-butyl-4-hydroxy-5-methylphenyl)propionate, hydroquinone, p-methoxyphenol, t-butylhydroxyanisole, n-octadecyl-3-(4-hydroxy-3,5-di-t-butylphenyl)propionate, 2,5-di-t-butylhydroquinone, 4,4'-butylidenebis(3-methyl-6-t-butyl phenol), t-butyl catechol, 4,4'-thiobis(6-t-butyl-m-cresol), and tocopherol; amine compounds such as N,N'-diphenyl-p-phenylenediamine and 4,4'-bis(dimethylbenzyl)diphenylamine; nitrile compounds such as 2-phenyl nitronyl nitroxide, 3-imidazoline nitroxide, and 4-hydroxy-2,2',6,6'-tetramethyl-piperidine-1-oxyl; and sulfur compounds such as dodecyl mercaptan and 1,2-diphenyl-2-thiol.

In addition, a solvent may be used in the suspension polymerization, and the solvent may be deionized water. In this case, the amount of the solvent may be appropriately controlled according to the amount of the vinyl chloride-based monomer used in polymerization and the size of a polymerization reactor. For example, the solvent may be used in an amount of 70 parts by weight or more on the basis of 100 parts by weight of the vinyl chloride-based monomer.

Also, in the suspension polymerization, an additive such as a polymerization regulator, a chain transfer agent, a pH adjuster, an antioxidant, a cross-linking agent, an antistatic agent, a scale inhibitor, and a surfactant, may be further added as needed in addition to the above-described active components, and the type and amount of the additive are not particularly limited and type and amount known in the art may be used. The additive may be added at any point, for example, at the starting of the suspension polymerization, in the middle of the polymerization, or after the polymerization, and may be added in batches or continuously.

In addition, the vinyl chloride-based copolymer may be prepared by additionally performing drying after the suspension polymerization, and the drying is not particularly limited and may be performed by a method known in the art.

In addition, the present invention provides a thermoplastic resin composition including the vinyl chloride-based copolymer.

The thermoplastic resin composition according to an embodiment of the present invention may include the vinyl chloride-based copolymer in an amount of 90 wt % or more, particularly, 95 wt % or more.

Also, the thermoplastic resin composition may include various additives according to an object to produce, for example, the use of a thermoplastic resin molded article. The additive is not specifically limited, but may include a plasticizer, a stabilizer, a lubricant, an impact reinforcing agent, a processing assistant agent, a pigment, etc.

Further, the present invention provides a thermoplastic resin molded article manufactured from the thermoplastic resin composition.

The thermoplastic resin molded article according to an embodiment of the present invention is produced from a thermoplastic resin composition containing the vinyl chloride-based copolymer, and may have excellent transparency.

Hereinafter, the present invention will be described in more detail, according to specific examples and experimental examples. However, the following examples and experimental examples are merely presented to exemplify the present invention, and the scope of the present invention is not limited thereto.

EXAMPLE 1

390 kg of deionized water was added to a reactor having an internal volume of 1 m$^3$ and equipped with a reflux condenser, and 160 g of polyvinyl alcohol having a degree of hydration of 80.5%, 120 g of polyvinyl alcohol having a degree of hydration of 42.3%, 50 g of hydroxypropylmethyl cellulose were added to the reactor, and then, 300 kg of a vinyl chloride monomer was added thereto. After that, 60 g of di-2-ethylhexyl peroxydicarbonate, 150 g of t-butyl peroxyneodecanoate, and 2100 g of poly(N-vinylpiperidone) were added to initiate a reaction. When the polymerization conversion rate was 20%, the addition of a mixture of dihexyl maleate and dihexyl fumarate was started and the addition was ended when the polymerization conversion rate was 35%. The mixture added was 75 kg in total and a weight ratio of the dihexyl maleate and the dihexyl fumarate in the mixture was 9:1. In order to achieve a goal of an average degree of polymerization of 1,000, the reaction temperature was maintained at 57° C. during the entire process of the polymerization reaction, and when an internal pressure of the reactor reached 6.3 kg/cm$^2$, 90 g of triethylene glycol-bis-3-(3-t-butyl-4-hydroxy-5-methylphenyl)propionate was added to terminate the reaction. Thereafter, an unreacted monomer and a vinyl chloride-based copolymer slurry produced were separated from each other and recovered, and the vinyl chloride-based copolymer slurry was dried in a fluidized bed dryer to obtain a vinyl chloride-based copolymer.

EXAMPLE 2

A vinyl chloride-based copolymer was obtained by the same method described in Example 1 except for adding 900 g of poly(N-vinyl piperidone) when the polymerization conversion rate was 40%.

EXAMPLE 3

A vinyl chloride-based copolymer was obtained by the same method described in Example 1 except for adding 150 g of poly(N-vinyl piperidone) when the polymerization conversion rate was 70%.

EXAMPLE 4

A vinyl chloride-based copolymer was obtained by the same method described in Example 1 except for adding 300 g of poly(N-vinyl piperidone) for initiating the reaction and adding 15 g immediately after terminating the polymerization instead of 2100 g of poly(N-vinyl piperidone).

EXAMPLE 5

A vinyl chloride-based copolymer was obtained by the same method described in Example 1 except for adding 450 g of an N-vinyl piperidone-vinyl alcohol copolymer instead of 2100 g of poly(N-vinyl piperidone).

EXAMPLE 6

A vinyl chloride-based copolymer was obtained by the same method described in Example 1 except for adding 450 g of poly(N-vinylpyrrolidone) instead of 2100 g of poly(N-vinyl piperidone).

COMPARATIVE EXAMPLE 1

A vinyl chloride-based copolymer was obtained by the same method described in Example 1 except for not adding poly(N-vinyl piperidone).

COMPARATIVE EXAMPLE 2

A vinyl chloride-based copolymer was obtained by the same method described in Example 1 except for adding 10.5 g of poly(N-vinyl piperidone).

COMPARATIVE EXAMPLE 3

A vinyl chloride-based copolymer was obtained by the same method described in Example 1 except for adding 3600 g of poly(N-vinyl piperidone).

COMPARATIVE EXAMPLE 4

390 kg of deionized water was added to a reactor having an internal volume of 1 m$^3$ and equipped with a reflux condenser, and 160 g of polyvinyl alcohol having a degree of hydration of 80.5%, 120 g of polyvinyl alcohol having a degree of hydration of 42.3%, and 50 g of hydroxypropylmethyl cellulose were added to the reactor, and then, 300 kg of a vinyl chloride monomer was added thereto. After that, 60 g of di-2-ethylhexyl peroxydicarbonate, and 150 g of t-butyl peroxyneodecanoate were added to initiate a reaction. When the polymerization conversion rate was 20%, the addition of a mixture of dihexyl maleate and dihexyl fumarate was started and the addition was ended when the polymerization conversion rate was 35%. In this case, the mixture added was 75 kg in total and a weight ratio of the dihexyl maleate and the dihexyl fumarate in the mixture was 9:1. In order to achieve a goal of an average degree of polymerization of 1,000, the reaction temperature was maintained at 57° C. during the entire process of the polymerization reaction, and when an internal pressure of the reactor reached 6.3 kg/cm$^2$, 90 g of triethylene glycol-bis-3-(3-t-butyl-4-hydroxy-5-methylphenyl)propionate was added to terminate the reaction. Thereafter, an unreacted monomer and a vinyl chloride-based copolymer slurry produced were separated from each other and recovered, and the vinyl chloride-based copolymer slurry was dried in a fluidized bed dryer to obtain a vinyl chloride-based copolymer. 450 g of poly(N-vinyl piperidone) was added to the vinyl chloride-based copolymer thus obtained and mixed.

EXPERIMENTAL EXAMPLE 1

The ratio of N-vinyllactam-based polymer compound derived units in each of the vinyl chloride-based copolymers prepared in Examples 1 to 6 and Comparative Examples 1 to 4 was measured.

In particular, the ratio of N-vinyllactam-based polymer compound derived units in a vinyl chloride-based copolymer was analyzed by analyzing the contents of elements N and O by using an elemental analyzer (EA). The results are shown in Table 1 below.

TABLE 1

| Division | Amount of N-vinyllactam-based polymer compound derived units (parts by weight) |
|---|---|
| Example 1 | 0.475 |
| Example 2 | 0.2195 |
| Example 3 | 0.0412 |
| Example 4 | 0.0795 |
| Example 5 | 0.0904 |
| Example 6 | 0.0683 |
| Comparative Example 1 | — |
| Comparative Example 2 | 0.0012 |
| Comparative Example 3 | 0.9019 |
| Comparative Example 4 | 0.1476 |

As shown in Table 1, the copolymers of Examples 1 to 6 according to example embodiments of the present invention were secured to contain from 0.04 parts by weight to 0.5 parts by weight of N-vinyllactam-based polymer compound derived units.

EXPERIMENTAL EXAMPLE 2

In order to comparatively analyze physical properties of thermoplastic resin compositions including the vinyl chloride-based copolymers prepared in Examples 1 to 6 and Comparative Examples 1 to 4, and molded articles manufactured therefrom, fusion test, transparency, haze and white index (W.I) were measured, and the results are listed in Table 2 below.

1) Fusion Test

Fusion test was conducted by measuring fusion time (min) and fusion torque (Nm), and performing comparative analysis.

In particular, to 100 parts by weight of each of the vinyl chloride-based copolymers, 3 parts by weight of tribasic lead lactate and 1 part by weight of a stearate were added and mixed. 60 g of the mixture thus obtained was injected into a Brabender plastograph tester, and time until reaching the maximum torque at a chamber temperature of 100° C. and torque were measured.

2) Measurement of Transparency and Haze

To 100 parts by weight of each of the vinyl chloride copolymers, 3 parts by weight of a tin-based thermal stabilizer (MT800, Songwon Industrial Co., Ltd.) and 0.3 parts by weight of a lubricant (SL63, LG Chem. Ltd.) were added and mulled at 160° C. for 4 minutes by using a roll-mill to manufacture a sheet with a thickness of 0.5 mm. Each sheet thus manufactured was cut to a predetermined size, then put into a frame with a thickness of 3 cm, and pre-heated at 185° C. for 2 minutes by using a press, heated at a low pressure for 3 minutes and cooled at a high pressure for 2 minutes to manufacture each compressed sheet. Transparency and haze were measured for each compressed sheet using a haze-gard plus instrument (BYK-Gardener). The higher the transparency value is, the better the product is, and the lower the haze value is, the better the product is.

3) Measurement of White Index (W.I)

To 100 parts by weight of each of the vinyl chloride copolymers, 5 parts by weight of a lead-based composite stabilizer (WPS-60, Songwon Industrial Co., Ltd.), 1.5 parts by weight of a processing auxiliary (PA-822, LG Chem. Ltd.), and 2 parts by weight of titanium oxide were added and mulled at 185° C. for 3 minutes by using a roll-mill to manufacture a sheet with a thickness of 0.5 mm. The white index of each sheet thus manufactured was measured by using NR-3000 (Noppon Denshoku Co., Ltd.). The higher the white index is, the better the product is.

TABLE 2

| | | | | Fusion test | |
|---|---|---|---|---|---|
| Division | Transparency | Haze | White index | Fusion time (min) | Fusion torque (Nm) |
| Example 1 | 90.8 | 3.25 | 73.8 | 55 | 54 |
| Example 2 | 91.3 | 3.15 | 73.1 | 54 | 53 |
| Example 3 | 90.6 | 2.98 | 72.9 | 54 | 54 |
| Example 4 | 91.5 | 3.07 | 74 | 55 | 49 |
| Example 5 | 90.7 | 3.12 | 73.4 | 54 | 53 |
| Example 6 | 90.6 | 2.95 | 73.7 | 55 | 52 |
| Comparative Example 1 | 83.8 | 3.15 | 62.5 | 66 | 66 |
| Comparative Example 2 | 83.9 | 3.11 | 63.2 | 67 | 66 |
| Comparative Example 3 | 84.3 | 4.29 | 65.9 | 70 | 63 |
| Comparative Example 4 | 84.2 | 5.37 | 64.9 | 67 | 64 |

As shown in Table 2, thermoplastic resin compositions including the vinyl chloride-based copolymers of Examples 1 to 6 according to example embodiments of the present invention and molded articles manufactured using thereof exhibited better processability and improved overall appearance characteristics, when compared to thermoplastic resin compositions including the vinyl chloride-based copolymers of Comparative Examples 1 to 4 and molded articles manufactured using thereof.

The invention claimed is:

1. A vinyl chloride-based copolymer comprising vinyl chloride-based monomer units, unsaturated fatty acid ester derived units, and N-vinyllactam-based polymer compound derived units,
   wherein the vinyl-chloride-based monomer units comprise vinyl chloride monomers or a combination of vinyl chloride monomers and vinyl-based monomers which are copolymerizable therewith,
   wherein the N-vinyllactam-based polymer compound derived units are included in an amount of 0.04 parts by weight to 0.5 parts by weight on the basis of 100 parts by weight of the vinyl chloride-based copolymer,
   wherein the unsaturated fatty acid ester derived units include repeating units derived from cis-isomer of an unsaturated fatty acid ester and repeating units derived from trans-isomer of an unsaturated fatty acid ester, and
   wherein the cis-isomer of the unsaturated fatty acid ester is a compound represented by the following Formula 1, and the trans-isomer of the unsaturated fatty acid ester is a compound represented by the following Formula 2:

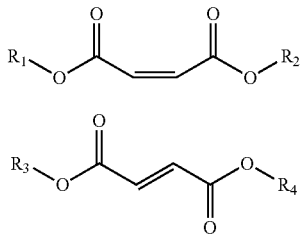

in Formula 1 or 2,
$R_1$ to $R_4$ are each independently selected from the group consisting of a linear or branched alkyl group having 5 to 13 carbon atoms, a cycloalkyl group having 5 to 12 carbon atoms, and a combination thereof.

2. The vinyl chloride-based copolymer of claim 1, wherein at least a portion of the N-vinyllactam-based polymer compound derived units is combined with chlorine atoms in the vinyl chloride-based monomer units.

3. The vinyl chloride-based copolymer of claim 1, wherein the N-vinyllactam-based polymer compound is a homopolymer or a copolymer having an N-vinyllactam structure.

4. The vinyl chloride-based copolymer of claim 3, wherein the homopolymer is at least one selected from the group consisting of poly(N-vinylpyrrolidone), poly(N-vinyl-4-butyl pyrrolidone), poly(N-vinyl-4-propylpyrrolidone), poly(N-vinyl-4-ethylpyrrolidone), poly(N-vinyl-4-methyl-5-ethylpyrrolidone), poly(N-vinyl-caprolactam), poly(N-vinyl-6-methylcaprolactam), and poly(N-vinyl-7-butylcaprolactam).

5. The vinyl chloride-based copolymer of claim 3, wherein the copolymer is at least one selected from the group consisting of an N-vinyl piperidone-vinyl alcohol copolymer, an N-vinyl-4-butyl pyrrolidone-vinyl alcohol copolymer, and an N-vinyl-4-propylpyrrolidone-vinyl alcohol copolymer.

6. The vinyl chloride-based copolymer of claim 1, wherein the copolymer comprises from 3 wt % to 35 wt % of the unsaturated fatty acid ester derived units.

7. The vinyl chloride-based copolymer of claim 1, wherein the repeating units derived from the cis-isomer and the repeating units derived from the trans-isomer of the unsaturated fatty acid ester have a weight ratio of 60:40 to 99:1.

8. A method for preparing the vinyl chloride-based copolymer of claim 1, the method comprising:
adding the N-vinyllactam-based polymer compound and the cis-isomer and the trans-isomer of the unsaturated fatty acid ester to the vinyl chloride monomers or the combination of vinyl chloride monomers and vinyl-based monomers which are copolymerizable therewith in the presence of a polymerization initiator and a protective colloid auxiliary, and performing suspension polymerization,
wherein the N-vinyllactam-based polymer compound is added in an amount of 0.005 parts by weight to 1 part by weight on the basis of 100 parts by weight of the vinyl chloride monomers or the combination of vinyl chloride monomers and vinyl-based monomers which are copolymerizable therewith, and
wherein the N-vinyllactam-based polymer compound is added at least one time of an initial stage, a middle stage and an end stage of the suspension polymerization.

9. The method for preparing the vinyl chloride-based copolymer of claim 8, wherein the cis-isomer and the trans-isomer of the unsaturated fatty acid ester are batch-added, or continuously added, in a time range in which a polymerization conversion rate is 35% or less.

10. The method for preparing the vinyl chloride-based copolymer of claim 8, wherein the cis-isomer and the trans-isomer of the unsaturated fatty acid ester are continuously added,
the continuous adding is started at a time when the polymerization conversion rate is 20% or more and ended at a time when the polymerization conversion rate is 35% or less, and
a total amount of the cis-isomer and the trans-isomer of the unsaturated fatty acid ester is added at a constant rate from the starting to the ending of the addition.

11. The method for preparing the vinyl chloride-based copolymer of claim 8, wherein a weight ratio of the cis-isomer and the trans-isomer of the unsaturated fatty acid ester is from 60:40 to 99:1.

12. The method for preparing the vinyl chloride-based copolymer of claim 8, wherein the cis-isomer and the trans-isomer of the unsaturated fatty acid ester are added in an amount of 3 parts by weight to 53 parts by weight on the basis of 100 parts by weight of the vinyl chloride-based monomers or the combination monomers or the combination of vinyl chloride monomers and vinyl-based monomers which are copolymerizable therewith.

13. The method for preparing the vinyl chloride-based copolymer of claim 8, wherein the N-vinyllactam-based polymer compound is selected from the group consisting of poly(N-vinylpyrrolidone), poly(N-vinyl-4-butyl pyrrolidone), poly(N-vinyl-4-propylpyrrolidone), poly(N-vinyl-4-ethylpyrrolidone), poly(N-vinyl-4-methyl-5-ethylpyrrolidone), poly(N-vinyl-caprolactam), poly(N-vinyl-6-methylcaprolactam), poly(N-vinyl-7-butylcaprolactam), an N-vinyl piperidone-vinyl alcohol copolymer, an N-vinyl-4-butyl pyrrolidone-vinyl alcohol copolymer, and an N-vinyl-4-propylpyrrolidone-vinyl alcohol copolymer.

14. The method for preparing the vinyl chloride-based copolymer of claim 8, wherein the initial stage of the suspension polymerization is at a time when the polymerization conversion rate is from 0% to less than 30%,
wherein the middle stage of the suspension polymerization is at a time when the polymerization conversion rate is from 30% to less than 60%, and
wherein the end stage of the suspension polymerization is at a time when the polymerization conversion rate is from 60% to 85%.

\* \* \* \* \*